United States Patent [19]

Wainerdi

[11] Patent Number: 4,698,144

[45] Date of Patent: Oct. 6, 1987

[54] APPARATUS FOR BALANCING ELECTROLYTIC CELL GAS WITH CIRCULATING ELECTROLYTE

[75] Inventor: Thomas J. Wainerdi, Lake Jackson, Tex.

[73] Assignee: The Dow Chemical Company, Midland, Mich.

[21] Appl. No.: 863,278

[22] Filed: May 15, 1986

[51] Int. Cl.$^4$ .................... C25B 9/00; C25B 11/03; C25B 11/12; C25B 15/08

[52] U.S. Cl. .................... 204/257; 204/277; 204/278; 204/284; 204/294; 204/265; 204/266; 204/270; 204/258

[58] Field of Search .................... 204/253–258, 204/265–266, 270, 277–278, 284, 294, 237; 429/19, 25

[56] References Cited

U.S. PATENT DOCUMENTS

| | | | |
|---|---|---|---|
| 3,271,196 | 9/1966 | Oswin | 429/5 |
| 3,364,070 | 1/1968 | Alexander | 433/192 |
| 3,379,626 | 4/1968 | Heuse et al. | 204/237 X |
| 3,457,114 | 7/1969 | Wedin | 429/14 |
| 3,468,713 | 9/1969 | Mueller | 254/131 |
| 3,506,493 | 4/1970 | Eisenberg | 204/266 |
| 3,525,641 | 8/1970 | Thorsheim | 429/25 |
| 3,527,618 | 9/1970 | Bushell | 429/12 |
| 3,589,944 | 6/1971 | Stanimirovitch et al. | 429/14 |
| 3,594,232 | 7/1971 | Spahrbier | 429/19 |
| 3,668,013 | 6/1972 | Franz | 204/213 |
| 3,748,180 | 7/1973 | Clausi et al. | 429/25 |
| 3,806,370 | 4/1974 | Nischik | 204/275 X |
| 4,039,421 | 8/1977 | Mas | 204/266 |
| 4,089,959 | 7/1978 | Fanciullo | 514/263 |
| 4,098,960 | 7/1978 | Gagnon | 429/25 |
| 4,214,970 | 7/1980 | Spaziante et al. | 204/265 |
| 4,519,889 | 5/1985 | Pellegri et al. | 204/284 X |
| 4,539,086 | 9/1985 | Fujita et al. | 204/266 X |

Primary Examiner—Donald R. Valentine

[57] ABSTRACT

An apparatus used in high pressure electrolytic cell operation which allows a cell to be operated at high pressures while providing balanced interface pressures between circulating liquids and gases. Each liquid and gas compartment in the cell is connected to a holding tank. Gas pressure in the holding tank is allowed to build up to the pressure required for cell operation before it is released. Positive displacement pumps circulate liquids through the cell at a pressure equal to the pressure of gases contained in the holding tanks. Gases are back-pressured into the gas compartments of the cell at a pressure equal to the pressure of the gases contained in the holding tanks thereby balancing the pressures of gases and liquids in the cell while allowing for circulation of the liquids.

26 Claims, 3 Drawing Figures

APPARATUS FOR BALANCING ELECTROLYTIC CELL GAS WITH CIRCULATING ELECTROLYTE

BACKGROUND OF THE INVENTION

In the operation of electrolytic cells, including fuel cells, it is advantageous to balance the pressure between a gas and a liquid electrolyte within the pores of a porous gas electrode so that a three-phase reaction between liquid, gas, and electrode can take place. It is also advantageous to operate electrolytic cells at high temperatures and pressures, because high temperatures and pressures enhance the sought-after three-phase reaction. However, there are several disadvantages in operating high-pressure electrolytic cells with static liquid electrolyte.

In the operation of electrolytic cells, the liquid electrolyte is depleted as a result of the reaction of the cell and requires recharging. Further, the electrolyte may become contaminated with the by-products of the cell reaction and require treatment to remove the contaminants. Also, the resulting product of the cell reaction may be suspended in the electrolyte and must be removed from the electrolyte.

In the operation of a high temperature and pressure cell in which the liquid electrolyte is stationary, the cell must be shut down whenever the liquid electrolyte needs to be recharged, treated or replaced. Once the electrolyte has been treated or recharged, the cell will not operate at peak performance until the required temperature and pressure have been built up in the cell. Thus, the time spent in treating the electrolyte and waiting for the cell to achieve the required temperature and pressure results in inefficient cell operation.

In the operation of high-pressure electrolytic cells, the prior art reveals methods of balancing gas and liquid electrolyte pressure within the pores of a porous electrode when the liquid electrolyte is static and not circulating.

The present invention allows for balancing liquid and gas pressure within the pores of a porous gas electrode in high-pressure electrolytic cell operation in which the liquid electrolyte is continuously being removed and fed to a cell without affecting cell operation. Therefore, a cell operated in accordance with the present invention may be operated at a high pressure without the need to shut down to treat or replace the electrolyte.

SUMMARY OF THE INVENTION

In accordance with the present invention, an electrolytic cell housing is divided by a porous gas electrode. Gas is fed into one side of the cell housing while liquid electrolyte is fed into the housing on the opposite side of the electrode. A conduit connects the portion of the cell containing the gas to a holding tank. Similarly, a conduit connects the portion of the cell containing the liquid to the same holding tank. The holding tank contains both the excess gas and used liquid electrolyte obtained from the cell. The conduit transferring used liquid from the cell to the holding tank must enter the tank above the surface of the liquid contained therein, in order to avoid the force of head pressure of the liquid contained in the tank. The conduit transferring excess gas from the cell to the holding tank must also enter the holding tank above the level of liquid in the tank. A pressure control valve releases excess gas from the tank when the pressure in the tank exceeds the pressure desired for cell operation. A level control valve allows liquid electrolyte to be drawn off the bottom of the tank, recharged, purified and recirculated through the cell by means of a positive displacement pump. The pressure of the gas and the liquid electrolyte is balanced within the electrolytic cell by means of the pressure control valve mounted on the holding tank, thereby allowing the gas and liquid to interface only within the pores of the porous electrode even though the liquid electrolyte is recirculating.

DESCRIPTION OF DRAWINGS

Referring now to the drawings.

DETAILED DESCRIPTION

Figure 1:
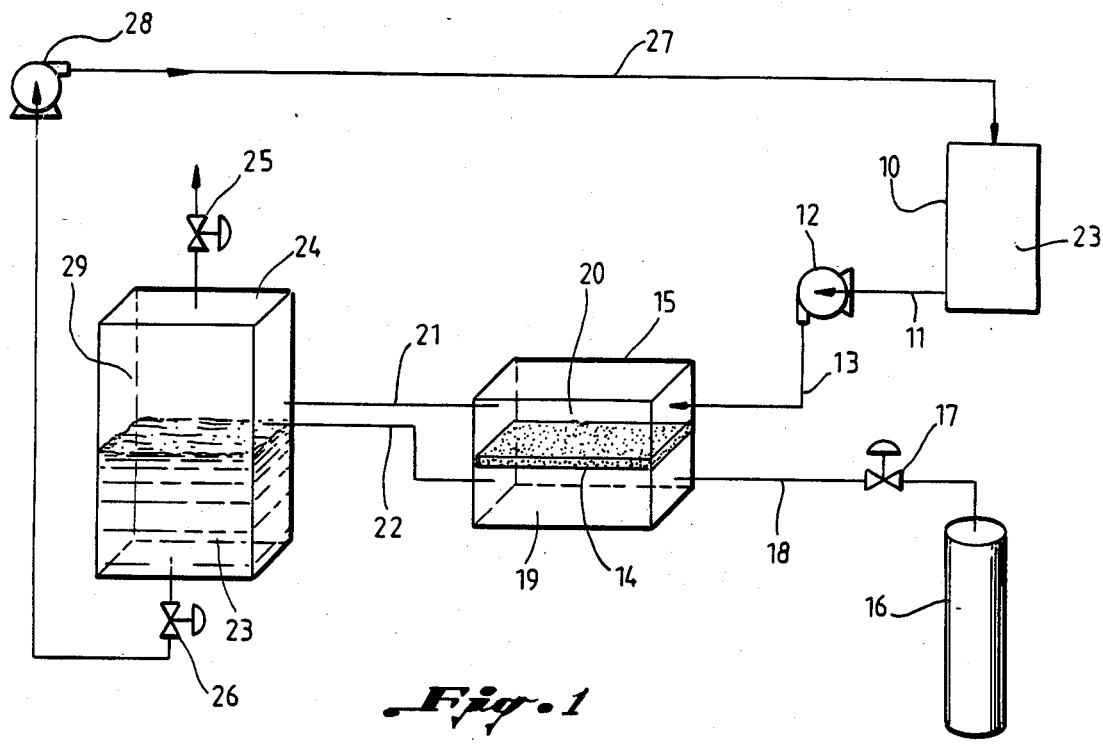
FIG. 1 is a schematic representation of an electrolytic half-cell system incorporating the present invention using a horizontal gas electrode.

Referring to FIG. 1, an electrolytic cell housing 15 is horizontally sectioned by a porous gas electrode 14 into an upper liquid compartment 20 and a lower gas compartment 19.

Commercially available electrodes suitable for use in the invention include woven carbon cloth electrodes, such as those sold by the Prototech Company. The electrodes comprise a substrate impregnated with a mixture of colloidal Teflon and carbon. The electrode used in practice of the invention contained levels of up to 1.0 mg/cm$^2$ of platinum. The housing 15 may be constructed of a gas impervious metal, such as titanium or nickel, which is compatible with the liquid electrolyte and gas used.

Gas is supplied to the gas compartment 19 in cell housing 15 through a conduit 18. Conduit 18 is connected to a flow control 17 which regulates the flow of gas from a source of gas 16. The gas used may either be a fuel gas or an oxidant gas. In practice, hydrogren and oxygen have been used in operation of an electrolytic cell employing the present invention. Gas is allowed to escape the gas compartment 19 through conduit 22 which connects the gas compartment 19 with a holding tank 24.

Liquid is allowed to enter the liquid compartment 20 in the cell housing 15 through the conduit 13. Conduit 13 is connected to a positive displacement pump 12, which draws liquid from a liquid supply tank 10 through conduit 11 and circulates the liquid to liquid compartment 20. Liquid used in accordance with the present invention may be liquid electrolyte such as 80 g/l HCL or 80 g/l NaOH. Liquid is allowed to exit the liquid compartment 20 through the conduit 21 which connects liquid compartment 20 with the holding tank 24.

When a porous gas electrode 14 is positioned horizontally within the cell housing 15, it is important that conduits 21 and 22 both enter the holding tank 24 above the surface of the liquid 23, in order to avoid the force of the head pressure of the liquid 23 from acting on the fluids transported by conduits 21 and 22. Further, the conduits 21 and 22 should be preferably horizontal as they traverse the distance between cell housing 15 and the holding tank 24, alternatively conduits 21 and 22 should slope downwardly toward holding tank 24 to avoid the effects of the liquid head pressure from the liquid contained in the conduit 21 from acting upon the liquid contained in the liquid compartment 20 of the cell housing 15 and to avoid the effects of liquid head pressure from potential condensation forming in the conduit 22.

The holding tank 24 contains used liquid 23 and excess gas 29 obtained from the cell 15. Holding tank 24 is fitted with a pressure control valve 25. Pressure control valve 25 allows the gas pressure in the holding tank 24 to build up to the desired cell operating pressure. If the gas pressure in the holding tank 24 exceeds the desired cell operating pressure, the pressure control valve 25 will allow excess gas 29 to escape until the pressure in the holding tank 24 reaches the desired cell operating pressure.

Holding tank 24 is also fitted with a liquid level controller 26. As liquid enters the holding tank 24 through conduit 21 from the liquid compartment 20, level controller 26 allows liquid 23 to be drawn from the holding tank 24. Liquid 23 drawn from the holding tank 24 through the level controller 26 may either be treated, to remove contaminants and product, recharged and returned to supply tank 10, or it may be merely recirculated through conduit 27 back to supply tank 10.

Figure 2:
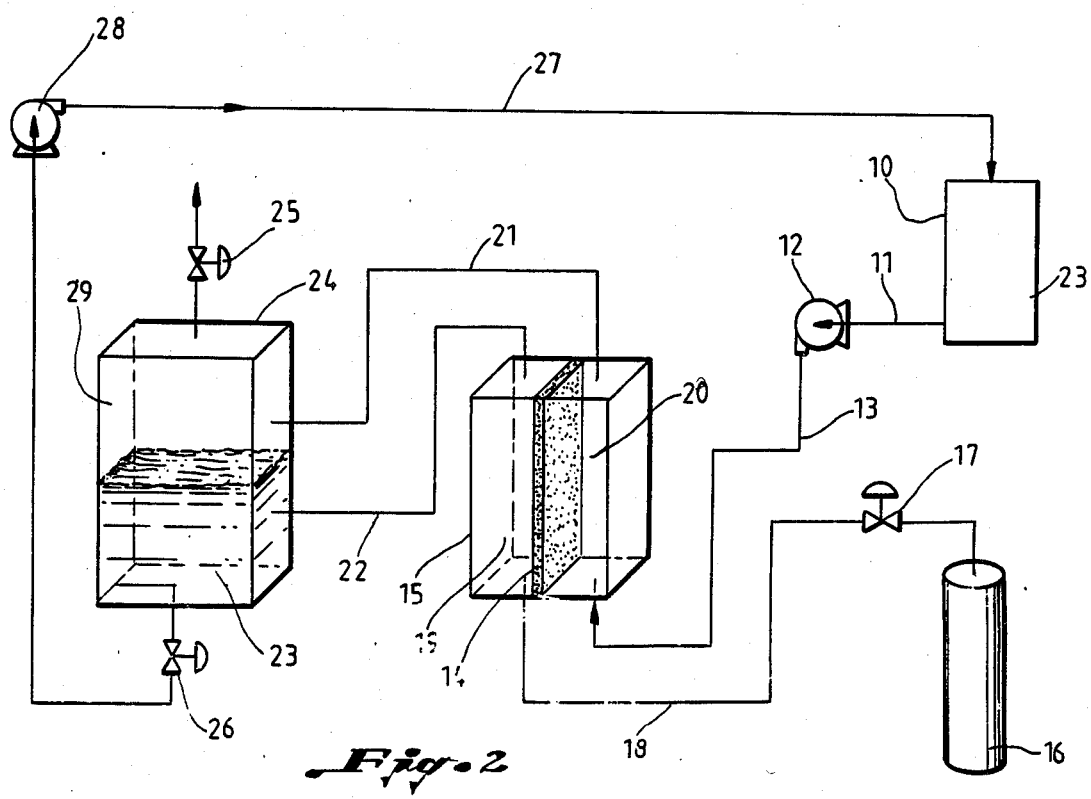
FIG. 2 is a schematic representation of an electrolytic half-cell system incorporating the present invention using a vertical gas electrode.

Referring to FIG. 2, an electrolytic cell housing 15 is sectioned by a vertically disposed porous gas electrode 14 into a gas compartment 19 and a liquid compartment 20. Gas is allowed to enter the gas compartment 19 through a conduit 18 which may be attached to a source of gas 16. The source of gas 16 is supplied with a flow control valve 17 which may control the flow of gas into the gas compartment 19. Gas is allowed to escape the gas compartment 19 through conduit 22 into a holding tank 24.

A positive displacement pump 12 draws fluid from a fluid supply tank 10 through conduit 11 and circulates the liquid into the liquid compartment 20 through a conduit 13. Liquid entering the liquid compartment 20 is allowed to exit the liquid compartment 20 through a conduit 21 into the holding tank 24.

When a porous gas electrode 14 is positioned vertically within an electrolytic cell 15, it is necessary, in order to balance the pressure between gas and liquid within the pores of the electrode 14, to compensate for the head pressure of the liquid contained within the liquid compartment 20 which is exerted upon the electrode 14. The added force exerted by the liquid head pressure may be compensated by positioning the conduit 22, connecting the gas compartment 19 of the electrolytic cell 15 to the holding tank 24 beneath the surface of the liquid 23 contained therein. By varying the level of the liquid 23 within the holding tank 24 by means of a liquid level controller 26, the head pressure of the liquid 23 contained in the tank 24 acting upon the conduit 22 may be made to equilibrate the head pressure of the liquid contained in the liquid compartment 20 acting on the porous gas electrode 14.

The holding tank 24 is fitted with a pressure control valve 25. The pressure control valve 25 allows gas 29 contained within the holding tank 24 to achieve a pressure equal to the pressure required for operation of the electrolytic cell 15. If the pressure of the gas 29 contained within the holding tank 24 exceeds the pressure required for optimum electrolytic cell operation, the pressure control valve 25 will allow gas to escape until the gas pressure within the holding tank 24 equals the required pressure.

It is important to note that although conduit 22 should enter the holding tank 24 beneath the surface of the liquid 23 contained in the holding tank 24 in order to compensate for the head pressure of the liquid contained in liquid compartment 20, conduit 21, which transports liquid from liquid compartment 20 to the holding tank 24, should enter the holding tank 24 above the surface of the liquid 23 in order to avoid the effects of the head pressure of the liquid 23 contained in the holding tank 24 from acting upon the liquid transported by conduit 21. Again, as previously noted, the elevation of the conduits 21 and 22 should be kept constant or should decrease continuously when transversing the distance between tank 24 and cell 15.

The liquid 23 contained in the holding tank 24 may be drawn from the tank 24 through the liquid level controller 26. Liquid drawn from the holding tank 24 through the level controller 26 may be treated to remove contaminants, recharged, and returned to liquid supply tank 10. Alternatively, the liquid 23 drawn from the holding tank 24 may merely be recirculated to the liquid supply tank 10 through conduit 27.

In either of the above embodiments of the present invention, the pressure control valve 25 is set to determine the operating pressure of the electrolytic cell 15. Gas is allowed to enter the gas compartment 19 of the cell 15 at a specific pressure, the pressure being provided by the gas flowing through control 17. The pressure control valve 25 is adjusted to allow gas to escape from the holding tank 24 when the pressure of the gas 29 contained in the holding tank 24 exceeds the pressure of the gas fed to the gas compartment 19 by the flow control 17. Therefore, the gas 29 is back-pressured into the gas compartment 19 at a pressure substantially equal to the gas supplied by the flow control 17. The positive displacement pump 12 is then set to circulate liquid through conduit 13 into liquid compartment 20, through conduit 21 and into the holding tank 24, at a pressure substantially equal to the pressure of the gas fed to the gas compartment 19 by the flow control 17.

Figure 3:
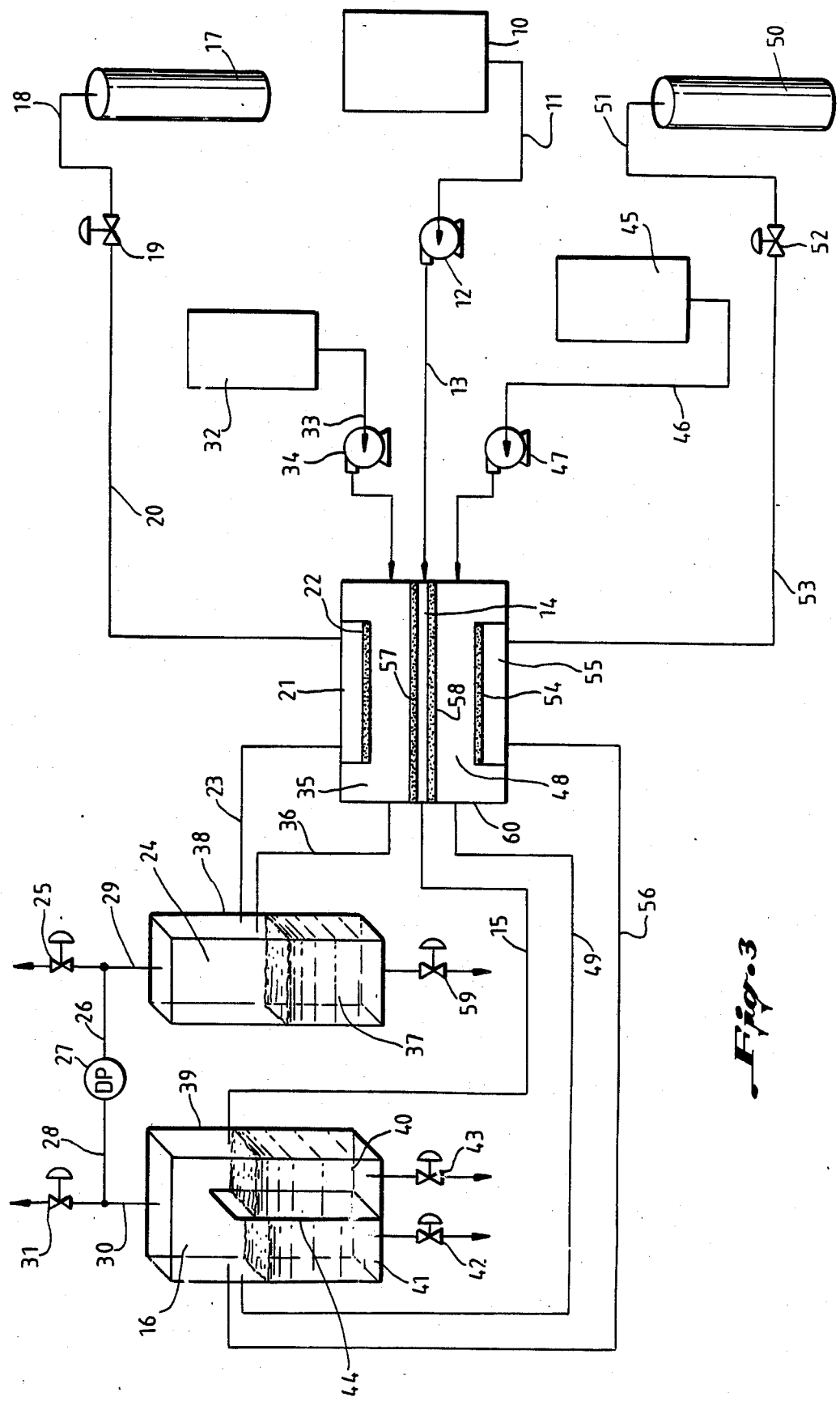
FIG. 3 is a schematic representation of a double depolarized high-pressure electrolytic cell using a pair of horizontal gas electrodes and incorporating the present invention.

Referring to FIG. 3, an electrolytic cell housing 60 is horizontally sectioned into three compartments 35, 14 and 48. Porous ion exchange membranes 57 and 58 are positioned so as to horizontally section the cell housing 60 and create a center compartment 14 between them.

Saturated sodium chloride brine is drawn from supply tank 10 through conduit 11 by a positive displacement pump 12. The positive displacement pump 12 circulates the brine through conduit 13 into the center cell compartment 14. The brine exits compartment 14 via conduit 15, and is circulated to holding tank 39. Holding tank 39 is divided by a center half-wall section 44 into fluid zones 40 and 41 and gas zone 16. Brine circulated to holding tank 39 via conduit 15 is contained in fluid zone 40. Flow controller 43 is attached to the tank in such a manner so as to allow brine to be drawn from fluid zone 40 for possible treatment and recirculation to supply tank 10. Flow controller 43 also controls the level of brine in fluid zone 40 so that the level of the brine in zone 40 does not exceed the height of half-wall 44 and flood into fluid zone 41.

Purified water is drawn from supply tank 45 through conduit 46 by positive displacement pump 47. The water drawn from supply tank 45 is circulated into electrolytic cell compartment 48 by the positive displacement pump 47.

Electrolytic cell compartment 48 is further divided by a horizontally-positioned oxygen-depolarized cathode 54 to create a gas compartment 55. In practice, a porous, woven carbon cloth electrode, manufactured by the Prototech Company, has been used. The electrode had colloidal Teflon and carbon impregnated into its fibers. The carbon had levels up to 1.0 mg/cm$^2$ of platinum in it.

As a result of the electromechanical reaction of the cell, the purified water circulated into compartment 48 becomes mixed with sodium hydroxide. The sodium hydroxide and water solution is circulated out of compartment 48 through conduit 49 to the fluid zone 41 in the holding tank 39. A level controller 42 is attached to holding tank 39 so as to allow the solution to be drawn from the fluid zone 41. Level controller 42 also controls the level of the solution in fluid zone 41 so that the level of the fluid does not exceed the height of the half-wall 44 and flood into fluid zone 40. The sodium hydroxide solution drawn from fluid zone 41 by the level controller 42 is removed from the system as product.

Oxygen gas is released from an oxygen supply tank 50 through gas line 51 by a flow controller 52. Oxygen gas released by flow controller 52 enters gas compartment 55 of cell 60 through gas line 53. Excess oxygen gas is allowed to escape gas compartment 55 through gas line 56 which is connected to gas zone 16 of the holding tank 39. The oxygen gas pressure in gas zone 16 of holding tank 39 builds up to the pressure desired for operation of the cell 60. Pressure control valve 31 allows excess oxygen gas to escape the holding tank 39 when the gas pressure in gas zone 16 exceeds the required cell operating pressure.

In the operation of this embodiment of the invention, it is important that conduits 49 and 15, and gas line 56 empty into holding tank 39 above the surface of the liquids contained in liquid zones 41 and 40 in order to avoid the force of the fluid head pressures of the liquids contained in holding tank 39 from acting upon conduits 49 and 15 and gas line 56. Further, the elevation of these lines should be horizontal or sloped downward in order to avoid the adverse effects of head pressure from fluids contained in the lines.

Electrolytic cell compartment 35 is further sectioned into a second gas compartment 21 by a porous hydrogen gas anode 22 positioned horizontally within compartment 35. Anode 22 is preferably the same type of electrode as cathode 54.

Purified water is drawn from holding tank 32 through conduit 33 by a positive displacement pump 34 into cell compartment 35. Due to the electrochemical reaction of the electrolytic cell, hydrochloric acid becomes mixed with the purified water circulated to compartment 35, producing a hydrochloric acid solution. This hydrochloric acid solution is circulated from compartment 35 through conduit 36 into holding tank 38. A level controller 59 attached to holding tank 38 allows the hydrochloric acid solution 37 to be removed from the tank 38.

Hydrogen gas is released from a hydrogen gas supply tank 17 through gas line 18 by a flow controller 19. Hydrogen gas released by flow controller 19 is allowed to enter gas compartment 21 through gas line 20.

The then depolarizing hydrogen gas in gas compartment 21 is allowed to escape through gas line 23 into a gas zone 24 in holding tank 38. The pressure of hydrogen gas contained in holding tank 38 is allowed to build up to the pressure required for operation of the electrolytic cell 60. If the pressure of the hydrogen gas contained in the gas zone 24 of holding tank 38 exceeds the pressure required for operation of the electrolytic cell 60, a pressure control valve 25 allows excess hydrogen gas to escape until the gas presure in gas zone 24 equals the pressure required for cell operation.

In the operation of this embodiment of the present invention, it is important that gas line 23 and conduit 36 both enter holding tank 38 above the surface of the liquid 37 contained in the tank. This arrangement reduces any adverse effects of the force of the head pressure of the liquid 37 from acting upon the fluids transported by gas line 23 or the conduit 36. And, as previously noted, it is desirable for gas line 23 and conduit 36 to remain horizontal or sloped downward towards tank 38 from cell 60 in order to avoid the effects of head pressure from the liquids contained in them.

A differential pressure controller 27 is connected to gas line 29 by gas line 26, and is connected to gas line 30 by gas line 28. Gas line 29 connects holding tank 38 to pressure control valve 25. Gas line 30 connects holding tank 39 to pressure control valve 31. The differential pressure controller 27 helps to keep the gas pressure in holding tank 38 equal to the gas pressure in holding tank 39. The differential pressure controller 27 compares the gas pressures in tanks 38 and 39 without allowing the gases contained in either to mix together. Differential pressure controller 27 is used to adjust either pressure control valve 31 or 25 in order to obtain the required cell operating pressure. Therefore, either pressure control valve 31 or 25 can be used to regulate the pressure of the entire system while the other valve is controlled to insure that the pressure differential between the holding tanks 38 and 39 is minimal. By equalizing the gas pressures in holding tanks 38 and 39, the corresponding gas pressures in gas compartments 21 and 55 will also be equalized.

Positive displacement pumps 47, 12 and 34 are set to circulate the liquid through the electrolytic cell 60 at a pressure substantially equal to the required cell pressure. Therefore, the gas pressure in gas compartment 21 will be substantially the same as the gas pressure in gas compartment 55, as well as the pressures of the liquids being circulated through compartments 35, 14 and 48. Interface pressures between gas and liquid across porous gas electrodes 22 and 54 and the liquid-liquid interface pressures across porous membranes 57 and 58 will thereby be balanced.

In accordance with the present invention, a double depolarized electrolytic cell such as that shown in FIG. 3 may be operated at high pressures while maintaining balanced interface pressures between the liquids and gases within the pores of porous gas electrodes when the liquids are recirculating. Certain other factors aside, the operating pressure of an electrolytic cell employing the present invention is only limited by the maximum operating pressure of the positive displacement pumps 34, 47, and 12. In a more general sense, through use of the present invention, an electrolytic cell may be operated at very high pressures, the upper limit of which is only dependent upon the abilities of the positive displacement pump and available gas supply pressures.

Referring still to FIG. 3, in yet another embodiment of the present invention a single liquid may be used. In this embodiment, membranes 57 and 58 may be removed and a single source of liquid may be supplied from the fluid supply tank 10. Because only a single liquid will be provided to the cell housing 60, conduits 15, 49, 46 and 33 along with supply tanks 32 and 45, pumps 34 and 47, half-wall section 44, and level controller 42 may also be eliminated. Once these modifications have been made, the cell may be operated as previously disclosed.

Various modifications and improvements may be made to the disclosed embodiments without departing from the overall scope and spirit of the invention.

What is claimed:

1. Apparatus to equalize the pressure between a circulating liquid and a gas, within the pores of a porous gas electrode in an electrolytic cell, comprising:
   a cell housing, separately connectable to a source of gas and a supply of liquid;
   a porous gas electrode positioned within said cell housing so as to section said housing into a first compartment for said gas and a second compartment for said liquid;
   a separate conduit connection connecting said source of gas to said first, gas compartment of said cell housing;
   a separate conduit connection connecting said supply of liquid to said second, liquid compartment of said cell housing;
   a holding tank for receiving excess gas and used liquid from said cell, said tank having separate conduit connections to said liquid compartment and said gas compartment; and
   a pump positioned in said conduit connection between said supply of liquid and said liquid compartment to circulate said liquid therebetween.

2. An apparatus, as recited in claim 1, wherein said first compartment is below said second compartment.

3. An apparatus, as recited in claim 1, wherein said first compartment is above said second compartment.

4. An apparatus, as recited in claim 1, wherein a first one of said conduit connections is between said gas compartment and said holding tank, said first conduit entering said holding tank above the surface of said liquid contained in said tank.

5. An apparatus, as recited in claim 1, wherein a second one of said conduit connections is between said liquid compartment and said holding tank, said second conduit entering said holding tank above the surface of said liquid contained in said tank.

6. An apparatus, as recited in claim 1, including a pressure control valve adapted to control the gas pressure within said tank.

7. An apparatus, as recited in claim 1, wherein said first and second conduit connections are at the same elevation between said housing and said holding tank.

8. An apparatus as recited in claim 1 wherein said first and second conduit connections decrease in elevation between said housing and said holding tank, wherein the elevation of the conduits is greater at said housing than at said holding tank.

9. An apparatus used to equalize the pressure between a circulating liquid and a gas, within the pores of a porous gas electrode in an electrolytic cell, comprising:
   a cell housing, separately connectable to a source of gas and a supply of liquid;
   a porous gas electrode positioned vertically within said cell housing so as to section said housing into a first compartment for said gas and a second compartment for said liquid;
   a separate conduit connection connecting said source of gas to said first, gas compartment of said cell housing;
   a separate conduit connection connecting said supply of liquid to said second, liquid compartment of said cell housing;
   a holding tank for containing excess gas and used liquid obtained from said cell, said tank being separately connected by separate conduits to said liquid compartment and said gas compartment; and
   a pump positioned in said connection between said supply of liquid and said liquid compartment to circulate said liquid therebetween.

10. An apparatus, as recited in claim 9, wherein a first one of said conduit connections is between said gas compartment and holding tank, said first conduit enters said holding tank below the surface of said liquid contained in said tank.

11. An apparatus, as recited in claim 9, wherein a second one of said conduit connections is between said liquid compartment and said holding tank, and said second conduit enters said holding tank above the surface of said liquid contained in said tank.

12. An apparatus, as recited in claim 9, including a pressure control valve adapted to control the gas pressure within said tank.

13. An apparatus, as recited in claim 9, wherein said first and second conduit connections are at the same elevation between said housing and said holding tank.

14. An apparatus, as recited in claim 9, wherein said first and second conduit connections decrease in elevation between said housing and said holding tank, wherein the elevation of said conduits is greater at said housing than at said holding tank.

15. An apparatus to equalize the pressure between circulating liquids and gases in the operation of an electrolytic cell, comprising:
   a cell housing separately connectable to separate sources of hydrogen gas, oxygen gas, saturated sodium-chloride brine and purified water;
   two vertically spaced, laterally disposed, ion exchange membranes positioned within said cell housing so as to section said housing into a first half-cell compartment, a brine compartment, and a second half-cell compartment, said brine compartment being positioned between said first half-cell and said second half-cell compartments;
   a woven, porous carbon cloth electrode positioned horizontally within said first half-cell compartment creating a gas zone and a liquid zone therein, said liquid zone being nearer to said brine compartment;
   a woven, porous carbon cloth electrode positioned horizontally within said second half-cell compartment creating a gas zone and a liquid zone therein, said liquid zone being nearer to said brine compartment;
   a first holding tank for receiving excess oxygen gas, used brine, and resultant sodium-hydroxide solution, said holding tank being partially sectioned so as to create two reservoirs within the interior of said tank, a first reservoir to receive used brine from said electrolytic cell, and a second reservoir to receive resultant sodium-hydroxide solution from said electrolytic cell, said tank having separate conduit connections to said brine compartment, said liquid zone within said second half-cell compartment and said gas zone within said second half-cell compartment;
   a second holding tank for receiving excess hydrogen gas and resultant hydrochloric acid solution obtained from said electrolytic cell, said tank having separate conduit connections to said gas zone within said first half-cell compartment and said liquid zone within said first half-cell compartment;

a pump positioned in a conduit connection between said liquid zone in said first half-cell compartment and a supply of purified water to circulate water into a liquid zone;

a pump positioned in a conduit connection between said brine compartment and said supply of brine to circulate brine into said brine compartment;

a pump positioned in a conduit connection between said liquid zone in said second half-cell compartment and a supply of purified water to circulate water into said liquid zone;

flow control means to regulate the flow of deplorizing hydrogen gas into said gas zone of said first half-cell compartment;

flow control means to regulate the flow of oxygen gas into said gas zone of said second half-cell compartment;

liquid level control means to control the level of liquid in said first holding tank so that one said liquid reservoir within said tank does not overflow into the other said liquid reservoir;

liquid level control means to control the level of liquid in said second holding tank;

pressure control means to control the pressure of said excess oxygen contained in said first holding tank;

pressure control means to control the pressure of said excess hydrogen contained in said second holding tank; and differential pressure control means located a conduit connection between said first holding tank and said second holding tank to substantially balance the pressure of the gases contained in said tanks without mixing said gases.

16. An apparatus, as recited in claim 15, including a first conduit connection between said gas zone in said first half-cell compartment and said second holding tank, said first conduit entering said second holding tank above the surface of said hydrochloric acid solution contained therein.

17. An apparatus, as recited in claim 15, including a second conduit connection between said liquid zone in said first half-cell compartment and said second holding tank, said second conduit entering said second holding tank above the surface of said hydrochloric acid solution contained therein.

18. An apparatus, as recited in claim 15, including a third conduit connection between said brine compartment and said first reservoir in said first holding tank, said third conduit entering said first holding tank above the surface of the brine contained in said first reservoir.

19. An apparatus, as recited in claim 15, including a fourth conduit connection between said liquid zone in said second half-cell compartment and said second reservoir in said first holding tank, said fourth conduit entering said first holding tank above the surface of the sodiumhydroxide solution contained in said second reservoir.

20. An apparatus, as recited in claim 15, including a fifth conduit connection between said gas zone in said second half-cell compartment and said first holding tank, said fifth conduit connection entering said first holding tank above the surface of all liquids contained therein.

21. An apparatus, as recited in claim 15, wherein all conduit connections are at the same elevation between said cell housing and said holding tanks.

22. An apparatus, as recited in claim 15, wherein all conduit connections decrease in elevation between said cell housing and said holding tanks, wherein the elevation of said conduits is greater at said cell housing than at said holding tanks.

23. An apparatus, as recited in claim 15, wherein said pumps are positive displacement pumps.

24. An apparatus to equalize the pressure between a circulating liquid and gases in the operation of an electrolytic cell, comprising:

a cell housing separately connectable to separate sources of a first gas, a second gas, and a liquid;

two vertically spaced, laterally disposed, gas electrodes positioned within said cell housing so as to section said cell housing into a first gas compartment, a liquid compartment, and a second gas compartment, said liquid compartment being positioned between said first and second gas compartments;

a first holding tank for receiving excess first gas, used liquid, and resultant solutions formed by the combination of said gases and said liquid;

a second holding tank for receiving excess second gas;

separate conduits connecting said source of said first gas to said first gas compartment, said source of said second gas to said second gas compartment and said source of said liquid to said liquid compartment;

separate additional conduits connecting said first gas compartment and said liquid compartments to said first holding tank;

separate conduits connecting second said gas compartment to said seocnd holding tank;

a pump positioned in said conduit between said source of liquid and said liquid compartment;

a separate flow control means to regulate the flow of said gases from said sources to said gas compartments;

liquid level control means to control holding tank liquid levels;

pressure control means to control the pressure of excess gases; and differential pressure control means to substantially balance the prssures of said gases in said holding tanks.

25. Apparatus to equalize the pressure between a circulating liquid and a gas, within the pores of a porous gas electrode in an electrolytic cell, comprising;

a cell housing, separately connectable to a source of gas, and a supply of liquid;

a porous gas electrode positioned within said cell housing so as to section said housing into a compartment for said gas, and a compartment for said liquid;

a separate conduit conection connecting said source of gas to said gas compartment of said cell housing;

a separate conduit connection connecting said supply of liquid to said liquid compartment of said cell housing;

a holding tank for receiving excess gas and used liquid from said cell, said tank having separate conduit connections to said liquid compartment and said gas compartment;

a pump, positioned in said conduit connection between said supply of liquid and said liquid compartment, to circulate said liquid therebetween; and a liquid level controller to control the level of said liquid contained within said holding tank.

26. An apparatus used to equalize the pressure between a circulating liquid and a gas, within the pores of a porous gas electrode in an electrolytic cell, comprising:

a cell housing separately connectable to a source of gas, and a supply of liquid;

a porous gas electrode, positioned vertically within said cell housing so as to section said housing into a compartment for said gas, and a compartment for said liquid;

a separate conduit connection connecting said source of gas to said gas compartment of said cell housing;

a separate conduit connection connecting said supply of liquid to said liquid compartment of said cell housing;

a holding tank for containing excess gas and used liquid from said cell, said tank being separately connected by separate conduits to said liquid compartment and said gas compartment;

a pump, positioned in said conduit connection between said supply of liquid in said liquid compartment to circulate said liquid therebetween; and a liquid level controller, to control the level of said liquid in said holding tank.

* * * * *